United States Patent [19]
Doll et al.

[11] 3,973,869
[45] Aug. 10, 1976

[54] TURBINE IN-TAKE BAFFLES

[75] Inventors: Duane E. Doll; Douglas H. Baker, both of York, Pa.

[73] Assignee: Allis-Chalmers Corporation, Milwaukee, Wis.

[22] Filed: Oct. 28, 1975

[21] Appl. No.: 626,280

[52] U.S. Cl. .............................. 415/160; 415/161
[51] Int. Cl.² ........................................ F01D 17/00
[58] Field of Search .......... 415/160, 161, 162, 163, 415/164

[56] References Cited
UNITED STATES PATENTS

| | | | |
|---|---|---|---|
| 2,028,368 | 1/1936 | White | 415/162 |
| 2,284,295 | 5/1942 | Moody | 415/DIG. 1 |
| 2,689,680 | 9/1954 | Lovesey | 415/161 |
| 3,542,484 | 11/1970 | Mason | 415/160 |

FOREIGN PATENTS OR APPLICATIONS

| | | | |
|---|---|---|---|
| 884,930 | 7/1953 | Germany | 415/160 |

*Primary Examiner*—Henry F. Raduazo
*Attorney, Agent, or Firm*—John P. Hines

[57] ABSTRACT

A hydraulic turbine is disclosed having wicket gate vanes which are rotatable between extreme positions to interrupt and permit the flow of water through a substantially cylindrical water passageway. In order to effectively block the flow of water through the passageway, the outer peripheral surface of the vanes must have a spherical configuration to match the circular cross-section of the cylindrical passageway. However, with this configuration, when the vanes are in an open position, a vee-shaped space is defined between the ends of the vanes and the water passageway. Baffles are provided to fill this space so that debris cannot collect therein.

1 Claim, 2 Drawing Figures

U.S. Patent  Aug. 10, 1976  3,973,869

TURBINE IN-TAKE BAFFLES

This invention pertains in general to hydraulic turbines and more particularly to a turbine having rotatable vanes.

In most hydraulic installations, trash racks are provided at the upstream end of the turbine to prohibit passage of excessive debris into the turbine. In some instances, however, debris may pass through these racks and enter the rotating parts of the turbine. In most cases, the debris will pass through the turbine without becoming wedged therein. However, if small spaces exist between stationary and movable parts of the turbine, debris which may become wedged therein can result in damage to the turbine.

It is, therefore, a general object of this invention to provide a turbine having rotatable vanes with means to insure that debris cannot become wedged between the vanes and the stationary part of the turbine.

A more specific object of the subject invention is to provide a turbine of the hereinbefore described type with baffles upstream from the turbine wicket gates which baffles fill the space defined between the open wicket gate vanes and the water confining passageway.

Figure 1:
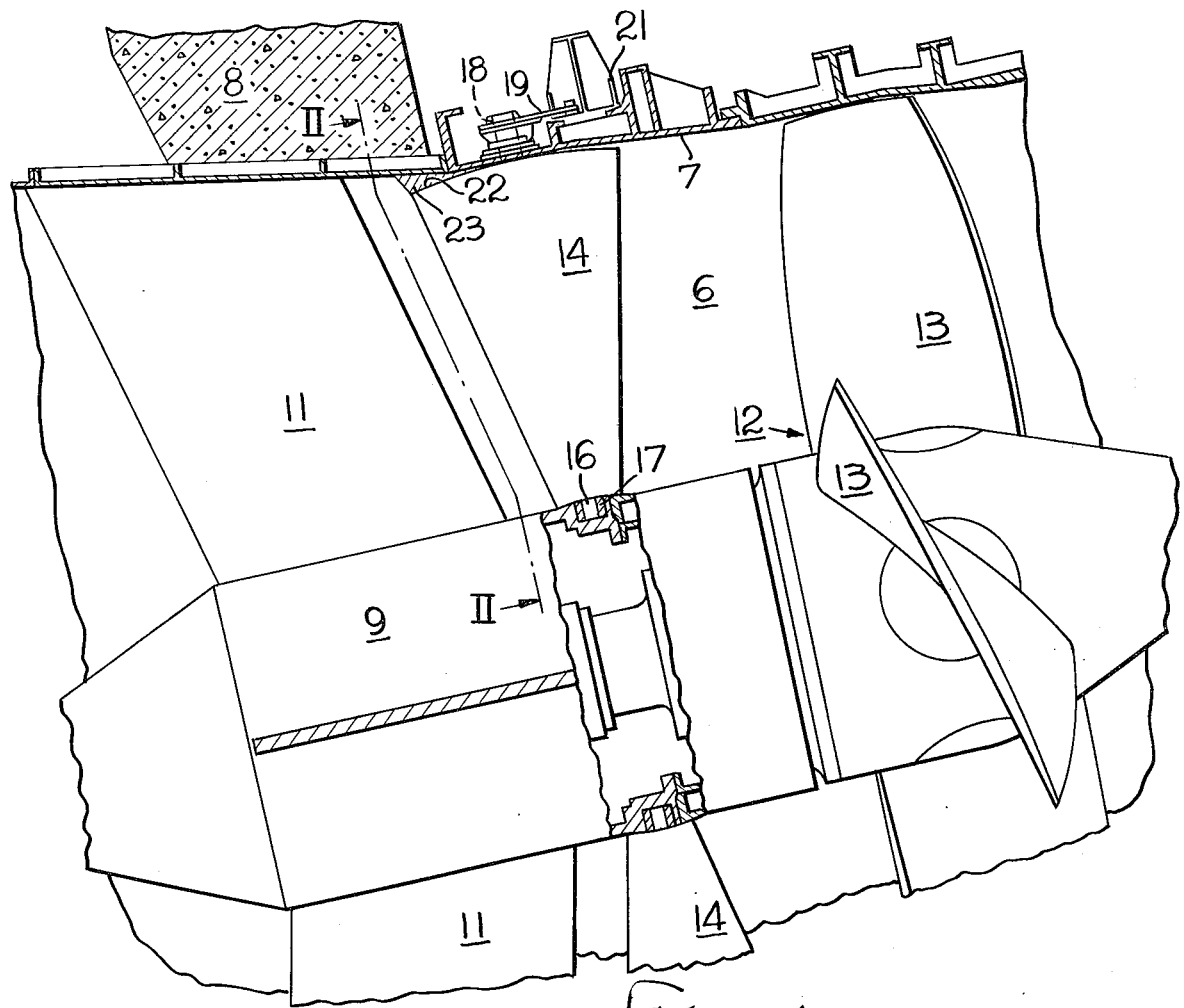
Figure 2:
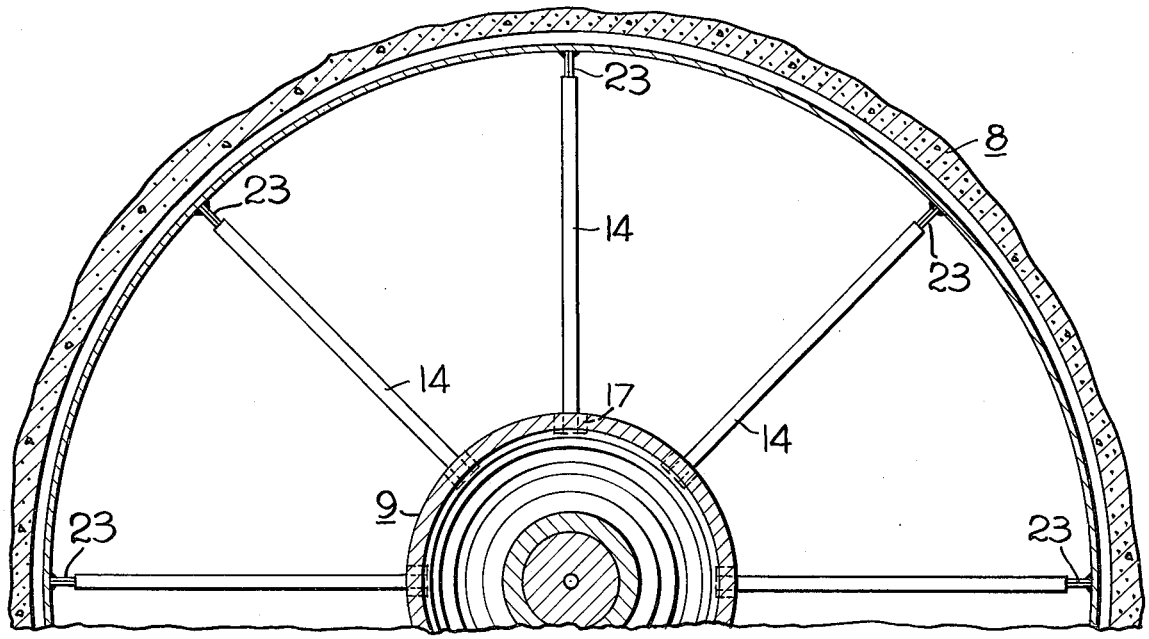

These and other objects of the subject invention will become more fully apparent as the following description is read in light of the attached drawing wherein:

FIG. 1 is a partial cross-sectional view of a turbine including the baffle feature which is the subject of this invention; and FIG. 2 is a cross-section taken along the line II—II of FIG. 1.

For purposes of illustration, the subject invention is shown in connection with a substantially horizontally disposed hydraulic turbine. A water confining passageway generally designated 6 is defined by a substantially cylindrical casing 1. This casing is in a conventional manner usually contained in a concrete foundation 8.

A hub generally designated 9 is supported within the water passageway 6 in any conventional manner such as by circumferentially spaced ribs 11. A turbine runner generally designated 12 is rotatably supported by the hub 9 about an axis which is common with the axis of the passageway 6. The runner 12 is provided with a plurality of circumferentially spaced radially disposed runner 13.

Upstream from the runner 12 the turbine is provided with a plurality of circumferentially spaced, radially disposed wicket gate vanes 14 which are rotatably supported in the hub 9 in any conventional manner. As herein shown for purposes of illustration, the wicket gate vanes 14 are provided with a trunnion 16 supported in a bushing 17 located in the hub 9. The gate vanes 14 are also provided with a stub shaft 18 at their outer peripheral ends which extends without the water confining passageway 6. A lever arm 19 is connected to the stub shaft 18 and is, in turn, connected to an operating ring 21. Power means (not shown) are connected to the operating ring 21 to cause it to oscillate about the axis of the turbine and pivot the lever arm 19. This causes the gate vanes 14 to pivot about their axes between extreme positions for permitting and interrupting the flow of water through the water confining passageway.

In order to insure substantial closing of the water confining passageway, the peripheral surface 22 of the gate vane 14 is curved to match the circular cross-section of the casing 7. Because of this matching configuration, when the gate vanes are in the closed position, water is substantially prohibited from flowing through the passageway. However, when the gate vanes are moved to the open position, as shown, a vee-shaped opening is defined between the outer peripheral surface 22 of the gate vane and the inner surface of the casing 7. It is possible in such a situation that debris passing through the trash rack (not shown) could become wedged in this vee-shaped opening. If this should occur when the gate vanes are moved to a closed position, the debris would be compressed and prohibit closing of the gate vanes. This could result in damage to the gate operating mechanism.

To prohibit debris from becoming wedged between the wicket gate vanes and the casing, a plurality of circumferentially spaced vee-spaced baffles 23 are connected to the interior surface of the casing 7. These baffles may be connected in any conventional manner such as by welding. The baffles are so arranged and located that when the gate vanes 14 are in the open position shown in the drawings, the baffles 23 fill the space between the peripheral surface of the gate vanes and the casing.

With this arrangement, it is impossible for debris to become wedged between the ends of the wicket gate vanes and the casing. Any debris that should pass through the trash rack would most likely flow harmlessly through the turbine. If debris should become wedge between adjacent baffles 23, the wicket gates when moved to a closed position would sheer the debris rather than compress it and would thereby permit complete closing of the vanes.

It should be understood that while the invention has been disclosed specifically in connection with the rotatable wicket gate vanes, the same arrangement could be provided in connection with rotatable impeller vanes.

From the above description, it can be seen that a relatively inexpensive however effective arrangement has been provided to insure that debris will not become wedged between the gate vanes and the turbine casing. Furthermore, with this arrangement if debris should become wedged between adjacent baffles, the baffles and wicket gates act as cutting surfaces to sheer off any debris that would prohibit complete closing of the wicket gates.

The embodiments of the invention in which an exclusive property or privilege is claimed are defined as follows:

1. A hydraulic turbine comprising: a water confining passageway; a turbine runner supported in said passageway for rotation about an axis; a set of circumferentially spaced and aligned runner blade vanes connected to said runner and extending radially therefrom; a set of circumferentially spaced and aligned wicket gate vanes supported in said passageway and disposed in a radial direction about said runner axis, at least one of said sets of vanes being rotatable about a radial axis between extreme positions to open and close said passageway, said rotatable vanes when in an open position defining a vee-shaped space between the peripheral edge of said vanes and said passageway; and a plurality of baffles connected to said passageway, said baffles having a configuration and being located to fill said vee-shaped space when said rotatable vanes are in an open position.

* * * * *